United States Patent

Eyssen

[15] 3,640,848

[45] Feb. 8, 1972

[54] MICROBIAL REDUCTION OF Δ STEROIDS

[72] Inventor: Hendrik Eyssen, Holsbeek, Belgium

[73] Assignee: Recherche et Industrie Therapeutiques, R.I.T., Genval, Belgium

[22] Filed: Nov. 26, 1969

[21] Appl. No.: 880,400

[30] Foreign Application Priority Data

Sept. 12, 1969 Great Britain ...................... 45,217/69

[52] U.S. Cl. ........................................................ 195/51 R
[51] Int. Cl. ........................................................ C07c 167/12
[58] Field of Search ...................................... 195/51

OTHER PUBLICATIONS

Coleman et al, Arch Biochemistry and Biophysics Vol. 72 pages 219–225 (1957)

Snog-Kjaer et al. J. Gen Microbiol. Vol. 14 pages 256–260 (1956)

*Primary Examiner*—Alvin E. Tanenholtz
*Attorney*—William H. Edgerton, Richard D. Foggio, Joan S. Keps, Alan D. Lourie and Joseph A. Marlino

[57] ABSTRACT

$\Delta^5$-Steroids are reduced to the corresponding 5,6-dihydro-5$\beta$ compounds in very high yield by using the organism Eubacterium nova. Among the products are coprosterol, 24-methyl-5$\beta$-cholestan-3$\beta$-ol, and 24-ethyl-5$\beta$-cholestan-3$\beta$-ol.

8 Claims, No Drawings

MICROBIAL REDUCTION OF Δ STEROIDS

The present invention relates to a process for the fermentative hydrogenation of $\Delta^5$ steroids to yield 5,6-dihydro-5 β products.

The process of the present invention comprises subjecting a $\Delta^5$ steroid to the reducing action of an *Eubacterium nova species* herein referred to by its ATCC No. 21,408 and isolating the resulting 5,6-dihydro-5 β product.

A certain number of 5,6-dihydro-5- β steroids are known and not all are natural products.

Those who are not easily or not at all disponible as such from natural sources are generally obtained by chemical modification of closely related natural steroids already presenting the 5,6-dihydro-5 β characteristics.

The attempts to obtain 5,6-dihydro-5 β steroids from the corresponding $\Delta^5$ products by either chemical or microbiological methods were up to now not encouraging because of the very limited yields of the known processes or because of the further steps these processes necessitate for isolating and purifying the obtained 5 β products.

So, the known chemical method consists in hydrogenating $\Delta^5$ steroids but this reaction substantially affords 5,6-dihydro-5-α products with very limited amounts of the 5 β compounds.

As to the known microbiological methods, they are based on the discovery that nonidentified micro-organisms present in the intestine of mammalians are responsible for the in situ hydrogenation of $\Delta^5$ steroids to yield corresponding 5 β compounds which are thus possibly obtained either by extraction from feces or by unidentified micro-organisms mixtures cultivated from feces.

The instant Eubacterium ATCC No. 21,408 fermentation of $\Delta^5$ steroids permits the hydrogenation of said $\Delta^5$ steroids to yield in substantially stoechiometric amount the desired 5,6-dihydro-5 β steroid which is then easily isolated as a pure compound from the reaction medium.

Thus, it is the first object of the present invention to provide an Eubacterium sp. fermentation method of $\Delta^5$ steroids and a further object of the invention is the provision of a process for the production of 5,6-dihydro-5 β steroids.

The instant process is useful to produce directly appreciable amounts of pure 5,6-dihydro-5 β steroids the ones being useful as choleretic or hypocholesterolemic agents, while the other are useful as intermediates for the preparation of steroids.

The Eubacterium ATCC No. 21,408 is an *Eubacterium nova species* isolated from the intestinal content of rats.

The strain presents straight or slightly curved small rods (the average size of which is 0.5 by 2 microns) occuring singly or in pairs, Gram-positive in young cultures, becoming Gram-negative after 3 to 5 days.

The physiology examination reveals that the micro-organism grows best from large inocula and, being strictly anaerobic, requires media with low redox potentials. The optimal growth temperature is between 35° and 42° C. The micro-organism does not grow or grows only very poorly on standard bacteriological media unless supplemented with a $\Delta^5$ steroid (e.g., cholesterol).

Culture of Eubacterium ATCC No. 21,408 for the purpose and practice of the present invention is in or on a medium favorable to the development of this micro-organism but liquid media are preferred. Therefore, any standard bacteriological liquid medium—provided it is supplemented with the adequate $\Delta^5$ steroid—is suitable for the practice of the invention when incubated anaerobically.

Examples of such media are fluid thioglycolate medium, e.g., from BBL (BBL Div. of BIOQUEST, Cockeysville, Md. U.S.A.) No. OI–397; cooked meat medium, e.g., from BBL No. OI–658; trypticase soy broth, e.g., from BBL No. OI–162. It has been found that growth on those media is stimulated by addition of powdered animal tissue, such as for instance 5 percent freeze-dried meat powder or 5 percent freeze-dried brain powder.

The duration of the fermentation reaction is depending of different conditions as, for instance, the age of the inoculum and its volume vs. the volume of the culture medium; the best inocula are those prepared from cultures at the end of the logarithmic phase of development. It has been noticed that a complete transformation can be reached after a 24 hours reaction period but prolongation of the fermentation for 10 days did not appear detrimental for the production of 5,6-dihydro-5 β steroids.

Suitable $\Delta^5$ steroids for the practice of the present invention are any $\Delta^5$ steroids not otherwise substituted in position 3 than by an oxo or hydroxyl group. In case of 3-keto $\Delta^5$ steroids, there is obtained a mixture of the corresponding 3-OH-5 β compound and of the 3-keto-5 β compound.

The following $\Delta^5$ steroids are given as possible starting materials:

1. Those presenting the $\Delta^5$-androstene structure and, among them:

$\Delta^5$-androstene derivatives such as $\Delta^5$-androstene-3 β, 16α-diol; $\Delta^5$-androstene-3 β, 17 β-diol (androstenediol); $\Delta^5$-androsten -3 β-ol-17-one (dehydroepiandrosterone); 17α-methyl-5-androstene-3β, 17β-diol (methandriol) and 17β-[3-(dimethylamino)propyl] methylamino}-androst-5-en-3β-ol (azacosterol).

2. Those presenting the $\Delta^5$ -pregne structure and, among them:

$\Delta^5$-pregnene derivatives such as $\Delta^5$-pregnen-3 β-ol-20-one (pregnenolone) 21-acyloxy derivatives (e.g., 21-acetoxypregnenolone), $\Delta^5$-pregnene-3β, 20β-diol and $\Delta^5$-pregnene-3β, 20α-diol.

3. Those presenting the $\Delta^5$-cholestene structure and, among them:

$\Delta^5$-cholestene itself and $\Delta^5$-cholestene derivatives such as 5-cholesten-3-one, cholesterol and epicholesterol; cholestadiene derivatives, e.g., cholesta-5:6,7:8-dien-3-ol (7-dehydrocholesterol) and cholesta-5:6,24:25-dien-3-ol (desmosterol).

4. $\Delta^5$-campestene derivatives e.g., campest-5-en-3β-ol (campesterol).

5. Those presenting the $\Delta^5$-ergostene structure and, among them:

ergostatriene derivatives such as ergosterol, 9β-ergosterol, lumisterol and 9α-lumisterol and derivatives thereof (e.g., 22,23-dihydroergosterol); ergostatetraene derivatives such as dehydroergosterol.

6. Those presenting the $\Delta^5$-stigmastene structure and, among them:

$\Delta^5$-stigmastene derivatives such as sgigmast-5-en-3β-ol (β-sitosterol); stigmastadiene derivatives such as stigmasta-5:6,22:23-dien-3-ol (stigmasterol) and 7-dehydrositosterol.

7. $\Delta^5$-spirostene derivatives such as ruscogenin, diosgenin, neoruscogenin, gentrogenin, rubijervine, isorubijervine and solasodine.

The following examples are illustrative of the process of the present invention and are not to be construed as limiting the invention.

EXAMPLE 1

Freeze-dried beef brain powder is extracted by acetone and 20 g. of the dried residue is suspended in a medium consisting of

| | |
|---|---|
| Trypticase peptone (a product from BBL Div. of Bioquest, Cockeysville, Md., U.S.A.) | 16.8 g. |
| Sodium chloride | 2.1 g. |
| Potassium phosphate, dibasic | 1.26 g. |
| Sodium thioglycolate | 1.4 g. |
| Methylene blue | 0.0014 g. |
| L-cystine | 0.336 g. |
| Sodium sulfite | 0.168 g. |
| Agar | 0.42 g. |
| Water | 500 ml. | and a suspension of 7 g. of cholesterol (5-cholesten-3β-ol) and 5 g. of lecithin in 200 ml. of water is added thereto.

The mixture is sterilized by heating for 20 minutes at 120° C., cooled and inoculated with 10 ml. of a culture of Eubacterium ATCC No. 21,408 prepared by inoculation of 1 ml. of the original culture in 10 ml. of the above medium and incubation for 5 days in the absence of oxygen.

The medium is then incubated anaerobically for 10 days at 37° C.

After that reaction time, the reaction mixture is extracted by four 700 ml. portions of petroleum ether (B.P. 40°–60° C.) which are then pooled, washed with water, dried over sodium sulfate, filtered and the filtrate is evaporated under reduced pressure.

The oily residue is taken up in 400 ml. of potassium hydroxide (10 percent) in ethanol and hydrolyzed by refluxing for 4 hours.

After cooling and addition of 400 ml. of water, the solution is extracted by four 400 ml. portions of petroleum ether (B.P. 40°–60 C.) which are then pooled and washed by four 250 ml. portions of water to reach neutral pH of the washings.

The organic solution is dried over sodium sulfate, evaporated to dryness, taken up again in 50 ml. of petroleum ether and chromatographed on 200 g. of Silica Gel "for column chromatography"(a product from E. Merck, Darmstadt, Germany) in a column of 34 mm. in diameter. Chromatography is carried out by stepwise elution with increasing concentrations of ethylacetate in petroleum ether: 500 ml. of 1 percent ethylacetate, 500 ml. of 2 percent ethylacetate, 500 ml. of 4 percent ethylacetate, 500 ml. of 6 percent ethylacetate and 200 ml. of 8 percent ethylacetate, successively.

Coprosterol is eluted with the 8 percent ethylacetate fraction and emerges in the effluent well before cholesterol.

The coprosterol-containing fraction is evaporated under reduced pressure and the residue is taken up in acetone from which 6.175 g. of coprosterol crystallize, showing the following characteristics:

one spot after thin layer chromatography on silica gel plates with petroleum ether-ethylacetate, 9:1. In this system the substance shows the same $Rf$-value (relative to reference cholesterol) as reference coprosterol (1.44) and is distinctly separated from cholesterol (1.00), cholestanol (0.90) and epicoprostanol (1.24).

by gas chromatography on a 120 cm. column of 1 percent JXR on Gas Chrom Q (JXR on Gas Chrom Q is a product from Applied Science Labs, State College, Pa., U.S.A.) 100–120 mesh, only one peak is detected. The retention time, relative to reference 5α-cholestan, corresponds to reference coprostanol (1.28) and is distinctly different from cholesterol (1.34), cholestanol (1.34), 5β-cholestan-3-one (1.34), 5α-cholestan-3-one (1.41), 4-cholesten-3-one(1.54) and 5-cholesten-3-one (1.75).

by gas chromatography on a 5-foot column of 3 percent QF–1 on Gas Chrom Q (QF–1 on Gas Chrom Q is a product from Applied Science Labs, State College, Pa, U.S.A.) 100–120 mesh, only one peak is detected. The retention time (relative to reference 5α-cholestan) is corresponding to that of reference coprosterol (2.03), and is distinctly different from reference 5β-cholestan-3α-ol (2.26) and cholesterol (2.26).

by mass spectrography, the fractionation pattern is identical to that of reference coprosterol and the molecular weight is 388.

EXAMPLE 2

Freeze-dried beef brain powder is extracted by acetone and 20 g. of the dried residue is suspended in a medium consisting of

| | |
|---|---|
| Trypticase peptone (a product from BBL Div. of Bioquest, Cockeysville, Md., U.S.A.) | 16.8 g. |
| Sodium chloride | 2.1 g. |
| Potassium phosphate, dibasic | 1.26 g. |
| Sodium thioglycolate | 1.4 g. |
| Methylene blue | 0.0014 g. |
| L-cystine | 0.336 g. |
| Sodium sulfite | 0.168 g. |
| Agar | 0.42 g. |
| Water | 500 ml. | and a suspension of 7 g. of 24-methyl-5-cholesten-3β-ol (campesterol) and 5 g. of lecithin in 200 ml. of water is added thereto.

The mixture is sterilized by heating for 20 minutes at 120° C., cooled and inoculated with 10 ml. of a culture of Eubacterium ATCC No. 21,408 prepared by inoculation of 1 ml. of the original culture in 10 ml. of the above medium and incubation for 5 days in the absence of oxygen.

The medium is then incubated anaerobically for 10 days at 37° C.

After that reaction time, the reaction mixture is extracted by four 700 ml. portions of petroleum ether (B.P. 40°–60° C.) which are then pooled, washed with water, dried over sodium sulfate, filtered and the filtrate is evaporated under reduced pressure.

The oily residue is taken up in 400 ml. of potassium hydroxide (10 percent) in ethanol and hydrolyzed by refluxing for 4 hours.

After cooling and addition of 400 ml. of water, the solution is extracted by four 400 ml. portions of petroleum ether (B.P. 40 –60° C.) which are then pooled and washed by four 250 ml. portions of water to reach neutral pH of the washings.

The organic solution is dried over sodium sulfate, evaporated to dryness, taken up again in 50 ml. of petroleum ether and chromatographed on 200 g. of Silica Gel "for column chromatography" (a product from E. Merck, Darmstadt, Germany) in a column of 34 mm. diameter. Chromatography is carried out by stepwise elution with increasing concentrations of ethylacetate in petroleum ether: 500 ml. of 1 percent ethylacetate, 500 ml. of 2 percent ethylacetate, 500 ml. of 4 percent ethylacetate, 500 ml. of 6 percent ethylacetate and 200 ml. of 8 percent ethylacetate, successively.

The reaction product is eluted with the 8 percent ethylacetate fraction and emerges in the effluent well before campesterol.

The reaction product-containing fraction is evaporated under reduced pressure and the residue is taken up in acetone from which 6.15 g. of 24-methyl-5 β-cholestan-3 β-ol crystallize, showing the following characteristics:

one spot on thin layer chromatography on silica gel plates with petroleum ether-ethylacetate, 9:1. In this system the substance shows the same Rf-value (relative to cholesterol)as reference 24-methyl-5βcholestane-3β-ol (1.43), and is distinctly separated from 24-methyl-5-cholestene-3β-ol (1.00).

by gas chromatography on a 120 cm. column of 1 percent JXR on Gas Chrom Q (JXR on Gas Chrom Q is a product from Applied Science Labs, State College, Pa, U.S.A.) 100–200 mesh, only one peak is detected. The relative retention time (relative to reference 5αcholestan) corresponds to that of reference 24-methyl-5βcholestan-3β-ol (1.46), and is distinctly different from that of 24-methyl-5-cholesten-3βol (1.54), 24-ethyl-5-cholesten-3 β-ol (1.70), and 24-ethyl-5βcholesten-3β-ol (1.64).

by mass spectography the fractionation pattern is identical to that of reference 24-methyl-5βstigmastan-3β-ol, and the molecular weight is 402.

EXAMPLE 3

Freeze-dried beef brain powder is extracted by acetone and 20 g. of the dried residue is suspended in a medium consisting of

| | |
|---|---|
| Trypticase peptone (a product from BBL Div. of Bioquest, Cockeysville, Md., U.S.A.) | 16.8 g. |
| Sodium chloride | 2.1 g. |
| Potassium phosphate, dibasic | 1.26 g. |
| Sodium thioglycolate | 1.4 g. |
| Methylene blue | 0.0014 g. |
| L-cystine | 0.336 g. |
| Sodium sulfite | 0.168 g. |

| | |
|---|---|
| Agar | 0.42 g. |
| Water | 500 ml. | and a suspension of 7 g. of 24-ethyl-5-cholesten-3β-ol and 5 g. of lecithin in 200 ml. of water is added thereto.

The mixture is sterilized by heating for 20 minutes at 120° C., cooled and inoculated with 10 ml. of a culture of Eubacterium ATCC No. 21,408 prepared by inoculation of 1 ml. of the original culture in 10 ml. of the above medium and incubation for 5 days in the absence of oxygen.

The medium is then incubated anaerobically for 10 days at 37 C.

After that reaction time, the reaction mixture is extracted by four 700 ml. portions of petroleum ether (B.P. 40°–60° C.) which are then pooled, washed with water, dried over sodium sulfate, filtered and the filtrate is evaporated under reduced pressure.

The oily residue is taken up in 400 ml. of potassium hydroxide (10 percent) in ethanol and hydrolyzed by refluxing for 4 hours.

After cooling and addition of 400 ml. of water, the solution is extracted by four 400 ml. portions of petroleum ether (B.P. 40°–60 C.) which are then pooled and washed by four 250 ml. portions or water to reach neutral pH of the washings.

The organic solution is dried over sodium sulfate, evaporated to dryness, taken up again in 50 ml. of petroleum ether and chromatographed on 200 g. of Silica Gel "for column chromatography" (a product from E. Merck, Darmstadt, Germany) in a column of 34 mm. diameter. Chromatography is carried out by stepwise elution with increasing concentrations of ethylacetate in petroleum ether: 500 ml. of 1 percent ethylacetate, 500 ml. of 2 percent ethylacetate, 500 ml. of 4 percent ethylacetate, 500 ml. of 6 percent ethylacetate and 200 ml. of 8 percent ethylacetate, successively.

The reaction product is eluted with the 8 percent ethylacetate fraction and emerges in the effluent well before 24-ethyl-5-cholesten-3β-ol.

The reaction product-containing fraction is evaporated under reduced pressure and the residue is taken up in acetone from which 5.67 g. of 24-ethyl-5β-cholestan-3β-ol crystallize, showing the following characteristics:

- one spot after thin layer chromatography on silica gel plates with petroleum ether-ethylacetate, 9:1. In this system the substance shows the same Rf-value as reference 24-ethyl-5β-cholestan-3β-ol (1.43) and is distinctly separated from reference 24-ethyl-5-cholesten-3β-ol (1.00).
- by gas chromatography on a 120 cm. column of 1 percent JXR on Gas Chrom Q (JXR on Gas Chrom Q is a product from Applied Science Labs, State College, Pa, U.S.A.) 100–120 mesh, only one peak can be detected. The relative retention time (relative to reference 5α-cholestan) corresponds to that of reference 24-ethyl-5β-cholestan-3β-ol (1.64), and is distinctly different from that of 24-ethyl-5-cholesten-3β-ol (1.70), 24-methyl-5-cholesten-3β-ol (1.54), 24-methyl-5β-cholestan-3β-ol (1.46), 24-ethyl-5,22-cholestadien-3β-ol (1.60), and 24-ethyl-5β-22-cholesten-3β-ol (1.55).
- by mass spectrogramphy the fractionation pattern is identical with that of reference 24-ethyl-5β-cholestan-3β-ol, and the molecular weight is 416.

EXAMPLE 4

Freeze-dried beef brain powder is extracted by acetone and 20 g. of the dried residue is suspended in a medium consisting of

| | |
|---|---|
| Trypticase peptone (a product from BBL Div. of Bioquest, Cockeysville, Md., U.S.A.) | 16.8 g. |
| Sodium chloride | 2.1 g. |
| Potassium phosphate, dibasic | 1.26 g. |
| Sodium thioglycolate | 1.4 g. |
| Methylene blue | 0.0014 g. |
| L-cystine | 0.336 g. |
| Sodium sulfite | 0.168 g. |
| Agar | 0.42 g. |
| Water | 500 ml. | and a suspension of 7 g. of 24-ehtyl-5,22-cholestadien-3β-ol (stigmasterol) and 5 g. of lecithin in 200 ml. of water is added thereto.

The mixture is sterilized by heating for 20 minutes at 120° C., cooled and inoculated with 10 ml. of a culture of Eubacterium ATCC No. 21,408 prepared by inoculation of 1 ml. of the original culture in 10 ml. of the above medium and incubation for 5 days in the absence of oxygen.

The medium is then incubated anaerobically for 10 days at 37° C.

After that reaction time, the reaction mixture is extracted by four 700 ml. portions of petroleum ether (B.P. 40°–60° C.) which are then pooled, washed with water, dried over sodium sulfate, filtered and the filtrate is evaporated under reduced pressure.

The oily residue is taken up in 400 ml. of potassium hydroxide (10 percent) in ethanol and hydrolyzed by refluxing for 4 hours.

After cooling and addition of 400 ml. of water, the solution is extracted by four 400 ml. portions of petroleum ether (B.P. 40 –60° C.) which are then pooled and washed by four 250 ml. portions of water to reach neutral pH of the washings.

The organic solution is dried over sodium sulfate, evaporated to dryness, taken up again in 50 ml. of petroleum ether and chromatographed on 200 g. of Silica Gel "for column chromatography" (a product from E. Merck, Darmstadt, Germany) in a column of 34 mm. diameter. Chromatography is carried out by stepwise elution with increasing concentrations of ethylacetate in petroleum ether: 500 ml. of 1 percent ethylacetate, 500 ml. of 2 percent ethylacetate, 500 ml. of 4 percent ethylacetate, 500 ml. of 6 percent ethylacetate and 200 ml. of 8 percent ethylacetate, successively.

The reaction product is eluted with the 8 percent ethylacetate fraction and emerges in the effluent well before stigmasterol.

The reaction product-containing fraction is evaporated under reduced pressure and the residue is taken up in acetone from which 5.15 g. of 24-ethyl-5β-22-cholesten-3β-ol crystallize, showing the following characteristics:

- by thin layer chromatography on silica gel plates with petroleum ether-ethylacetate, 9:1, only one spot is detected. The Rf-value of this spot relative to cholesterol corresponds to that of reference 24-ethyl-5β-22-cholesten-3β-ol (1.46) and is distinctly separated from 24-ethyl-5,22-cholestadien-3β-ol (1.00).
- by gas chromatography on a 120 cm. column of 1 percent JXR on Gas Chrom Q (JXR on Gas Chrom Q is a product from Applied Science Labs, State College, Pa, U.S.A.) only one peak is observed, and the retention time (relative to 5α-cholestan) corresponds to that of reference 24-ethyl-5β-22-cholesten-3β-ol (1.55) and is distinctly different from the retention times of 24-ethyl-5,22-cholestadien-3β-ol (1.60), 24-ethyl-5β-cholestan-3β-ol (1.64), 24-ethyl-5-cholesten-3β-ol (1.70), and 24-methyl-5β-cholestan-3β-ol (1.46).
- by mass spectrography, the fractionation pattern is identical with that of reference 24-ethyl-5β-cholestan-3β-ol, and the molecular weight is 414.

EXAMPLE 5

5-Pregnen-3β, 20β-diol (15 mg. and lecithin (40 mg. are suspended in 1 ml. of water and the suspension is poured into 10 ml. of a medium consisting of:

| | |
|---|---|
| Trypticase peptone (a product from BBL Div. of Bioquest, Cockeysville, Md., U.S.A.) | 16.8 g. |
| Sodium chloride | 2.1 g. |
| Potassium phosphate, dibasic | 1.26 g. |
| Sodium thioglycolate | 1.4 g. |
| Methylene blue | 0.0014 g. |
| L-cystine | 0.336 g. |
| Sodium sulfite | 0.168 g. |

| | |
|---|---|
| Agar | 0.42 g. |
| Yeast extract | 7 g. |
| Acetone extracted beef brain | 20 g. |
| Water | 700 ml. |

The mixture is sterilized by heating for 20 minutes at 120° C., cooled and inoculated with 10 ml. of a culture of Eubacterium ATCC No. 21,408 prepared by inoculation of 1 ml. of the original culture in 10 ml. of the above medium and incubation for 5 days in the absence of oxygen.

The medium is then incubated anaerobically for 7 days at 37° C.

After fermentation the medium is saponified with 30 ml. of 5 percent KOH in ethanol at refluxing temperature for 2 hours.

After cooling and addition of 30 ml. of water, the unsaponifiable fraction is extracted three times with an equal volume of diethyl ether. The ether layers are pooled, washed with water to neutrality, dried over $Na_2SO_4$ and filtered to yield 12.75 mg. of 5$\beta$-pregnan-3$\beta$, 20$\beta$-diol showing the following characteristics:

by thin layer chromatography of the ether extracts on silica gel using petroleum ether-ethylacetate, 7:3, only one spot is detected. The Rf-value of this spot relative to cholesterol corresponds to that of reference 5$\beta$-pregnan-3$\beta$, 20$\beta$-diol (0.41), and is distinctly different from that of 5$\alpha$-pregnan-3$\beta$, 20$\beta$-diol (0.34), 5-pregnen-3$\beta$, 20$\beta$-diol (0.34) and cholesterol (1.00).

by gas chromatography on a 120 cm. column of 1 percent JXR on Gas Chrom Q (JXR on Gas Chrom Q is a product from Applied Science Labs, State College, Pa, U.S.A.) 100–120 mesh, the retention time (relative to 5$\alpha$-cholestan) of the transformation product corresponds to that of reference 5$\beta$-pregnan-3$\beta$, 20$\beta$-diol (0.72) and is distinctly different from that of 5$\alpha$-pregnan-3$\beta$, 20$\beta$-diol (0.76) and that of 5-pregnen-3$\beta$, 20$\beta$-diol (0.76).

by mass spectrography, the fractionation pattern is identical to that of reference 5$\beta$-pregnane-3$\beta$, 20$\beta$-diol and the molecular weight is 320.

EXAMPLE 6

5-Androsten-3$\beta$-ol-17-one (dehydroepiandrosterone) (15 mg.) and lecithin (40 mg.) are suspended in 1 ml. of water and the suspension is poured into 10 ml. of a medium consisting of:

| | |
|---|---|
| Trypticase peptone (a product from BBL Div. of Bioquest, Cockeysville, Md., U.S.A.) | 16.8 g. |
| Sodium chloride | 2.1 g. |
| Potassium phosphate, dibasic | 1.26 g. |
| Sodium thioglycolate | 1.4 g. |
| Methylene blue | 0.0014 g. |
| L-cystine | 0.336 g. |
| Sodium sulfite | 0.168 g. |
| Agar | 0.42 g. |
| Yeast extract | 7 g. |
| Acetone extracted beef brain | 20 g. |
| Water | 700 ml. |

The mixture is sterilized by heating for 20 minutes at 120° C., cooled and inoculated with 10 ml. of a culture of Eubacterium ATCC No. 21,408 prepared by innoculation of 1 ml. of the original culture in 10 ml. of the above medium and incubation for 5 days in the absence of oxygen.

The medium is then incubated anaerobically for 7 days at 37° C.

After fermentation the medium is saponified with 30 ml. of 5 percent KOH in ethanol at refluxing temperature for 2 hours.

After cooling and addition of 30 ml. of water, the unsaponifiable fraction is extracted three times with an equal volume of diethyl ether. The ether layers are pooled, washed with water to neutrality, dried over $Na_2SO_4$ and filtered to yield 12 mg. of 5$\beta$-androstan-3$\beta$-ol-17-one showing the following characteristics:

by thin layer chromatography of the ether extracts on silica gel using petroleum ether-ethylacetate, 7:3, only one spot is detected. The Rf-value of this spot relative to cholesterol corresponds to that of 5$\beta$-androstan-3$\beta$-ol-17-one (0.585) and is distinctly different from that of 5$\alpha$-androstan-3$\beta$-ol-17-one (0.44), 5-androsten-3$\beta$-ol-17-one (0.50) and cholesterol (1.00).

by gas chromatography on a 120 cm. column of 1 percent JXR on Gas Chrom Q (JXR on Gas Chrom Q is a product from Applied Science Labs, State College, Pa, U.S.A.) 100–120 mesh, the retention time (relative to 5$\alpha$-cholestan) of the transformation product corresponds to that of 5$\beta$-androstan-3$\beta$-ol-17-one (0.54), and is distinctly different from that of 5$\alpha$-androstan-3$\beta$-ol-17-one (0.57), and 5-androsten-3$\beta$-ol-17-one (0.57).

by mass spectrography the fractionation pattern is identical to tat of reference 5$\beta$-androstan-3$\beta$-ol-17-one, and the molecular weight is 290.

EXAMPLE 7

The technique is that described in Example 5 but, instead of employing 5-pregene-3$\beta$, 20$\beta$-diol, there is employed $\Delta^5$-androstene-3$\beta$, 16$\alpha$-diol; $\Delta^5$-androstene-3$\beta$, 17$\beta$-diol (androstenediol); 17$\alpha$-methyl-5-androstene-3$\beta$, 17$\beta$-diol (methandriol); 17$\beta$- {[3-(dimethylamino)propyl]methylamino} -androst-5-en-3$\beta$-ol (azacosterol); $\Delta^5$-pregnen-3$\beta$-ol-20-one (pregnenolone); 5-pregnene-3$\beta$, 21-diol-20-one-21-acetate (21-acetoxypregnenolone); 5-pregnene-3$\beta$, 20$\alpha$-diol; $\Delta^5$-cholestene; $\Delta^5$-cholesten-3-one; 5-cholesten-3$\alpha$-ol (epicholesterol); cholesta-5:6,7:8-dien-3-ol (7-dehydro-cholesterol); cholesta-5:6,24:25-dien-3-ol (desmosterol); ergosta-5,7,22-trien-3$\beta$-ol (ergosterol); 9$\beta$ergosta-5,7,22-trien-3$\beta$-ol (9$\beta$-ergosterol); 9$\beta$, 10$\alpha$ergosta-5,7,22-trien-3$\beta$ol (lumisterol); 9$\alpha$, 10$\alpha$-ergosta-5,7,22-trien-3$\beta$ol (9$\alpha$-lumisterol); ergosta-5,7-dien-3$\beta$-ol (22,23-dihydroergosterol); ergosta-5,7,9(11),22 tetraen -3$\beta$-ol (dehydroergosterol); stigmasta-5,7 dien-3$\beta$-ol (7-dehydro-sitosterol); $\Delta^5$-20$\beta_F$, 22$\alpha_F$, 25$\alpha_F$ spirostene-1$\beta$, 3$\beta$-diol (ruscogenin); $\Delta^5$-20$\beta_F$, 22$\alpha_F$, 25$\alpha_F$-spirosten -3$\beta$-ol (diosgenin); $\Delta^5$-20$\beta_F$, 22$\alpha_F$, 25$\alpha_F$-spirostene-1$\beta$, 3$\beta$-diol-25 L (neoruscogenin); $\Delta^5$, 20$\beta_F$, 22$\alpha_F$, 25$\alpha_F$-spirosten-3$\beta$-ol, 12 one (gentrogenin); $\Delta^5$-solanidene-3$\beta$, 12$\alpha$-diol (rubijervine); $\Delta^5$-solanidene-3$\beta$, 18-diol (isorubijervine); $\Delta^5$-20$\beta_F$, 22$\alpha_F$, 25$\alpha_F$, 27 azaspirosten -3$\beta$-ol(solasodine); to yield 5$\beta$-androstane-3$\beta$, 16$\alpha$-diol; 5$\beta$-androstane-3$\beta$, 17$\beta$-diol; 17$\alpha$-methyl-5$\beta$-androstane-3$\beta$, 17$\beta$-diol; 17$\beta$- {[3-dimethylamino)propyl]methylamino} -5$\beta$-androstan-3$\beta$-ol; pregnan-3$\beta$-ol-20-one (3$\beta$-hydroxy-5$\beta$-pregnan-20-one); 21-acetoxy-5$\beta$-pregnan -3$\beta$-ol-20-one; 5$\beta$-pregnane-3$\beta$, 20$\alpha$-diol; 5$\beta$-cholestane (coprostane); 5$\beta$-cholestan-3-one and 5$\beta$-cholestan-3$\beta$-ol; 5$\beta$-cholestan-3$\alpha$-ol; 5$\beta$-cholesta-7:8-en-3$\beta$-ol; 5$\beta$-cholesta-24:25-en-3$\beta$-ol; 5$\beta$-ergosta-7,22-dien-9$\beta$-ol; 5$\beta$, 9$\beta$-ergosta-7,22-dien-3$\beta$-ol; 5$\beta$, 9$\beta$, 10$\alpha$-ergosta-7.22-dien-3$\beta$-ol; 5$\beta$, 9$\alpha$, 10$\alpha$-ergosta-7,22-dien-3$\beta$-ol; 5$\beta$-ergosta-7-en-3$\beta$-ol; 5$\beta$-ergosta-7,9(11), 22 trien-3$\beta$-ol; 5$\beta$-stigmast-7-en-3$\beta$-ol; 5$\beta$, 20$\beta_F$, 22$\alpha_F$, 25$\alpha_F$-spirostane-1$\beta$, 3$\beta$-diol; 5$\beta$, 20$\beta_F$, 22$\alpha_F$, 25$_F$-spirostan-3$\beta$-ol; 5$\beta$, 20$\beta_F$, 22$\alpha_F$, 25$\alpha_F$-spirostan-3$\beta$-ol-25L; 5$\beta$, 20$\beta_F$, 22$\alpha_F$, 25$\alpha_F$-spirostan-3$\beta$-ol-12 one; 5$\beta$-solanidane-3$\beta$, 12$\alpha$-diol; 5$\beta$-solanidane-3$\beta$, 18-diol; 5$\beta$, 20$\beta_F$, 22$\alpha_F$, 25$\alpha_F$, 27-azaspirostan-3$\beta$-ol, respectively.

What I claim is:

1. A method of producing a 5$\beta$-steroid which comprises subjecting a 3-oxo or 3-hydroxy- $\Delta^5$ steroid to microbiological reduction with enzymes of Eubacterium ATCC No. 21,408 and recovering the resulting 5,6-dihydro-5$\beta$ product.

2. A method of producing a 3-OH-5$\beta$-steroid according to claim 1 which comprises subjecting a 3-keto $\Delta^5$ steroid to microbiological reduction with enzymes of Eubacterium ATCC No. 21,408 and recovering the resulting 5,6-dihydro-5$\beta$-product.

3. A method of producing coprosterol according to claim 1 which comprises subjecting cholesterol to microbiological reduction with enzymes of Eubacterium ATCC No. 21,408 and recovering the resulting coprosterol.

4. A method of producing 24-methyl-5β-cholestan-3β-ol according to claim 1 which comprises subjecting campesterol to microbiological reduction with enzymes of Eubacterium ATCC No. 21,408 and recovering the resulting 24-methyl-5β-cholestan-3β-ol.

5. A method of producing 24-ethyl-5β-cholestan-3β-ol according to claim 1 which comprises subjecting β-sitosterol to microbiological reduction with enzymes of Eubacterium ATCC No. 21,408 and recovering the resulting 24-ethyl-5β-cholestan-3β-ol.

6. A method of producing 24-ethyl-5β-22-cholesten-3β-ol according to claim 1 which comprises subjecting stigmasterol to microbiological reduction with enzymes of Eubacterium ATCC No. 21,408 and recovering the resulting 24-ethyl-5β-22-cholesten-3β-ol.

7. A method of producing 5β-pregnane-3β, 20β-diol according to claim 1 which comprises subjecting 5-pregnene-3β, 20β-diol to microbiological reduction with enzymes of Eubacterium ATCC No. 21,408 and recovering the resulting 5β-pregnane-3β, 20β-diol.

8. A method of producing 5β-androstan-3β-ol-17-one according to claim 1 which comprises subjecting dehydro-epiandrosterone to microbiological reduction with enzymes of Eubacterium ATCC No. 21,408 and recovering the resulting 5β-androstan-3β-ol-17-one.

* * * * *